(12) United States Patent
Ding et al.

(10) Patent No.: US 8,938,383 B2
(45) Date of Patent: Jan. 20, 2015

(54) ENABLING TEST SCRIPT PLAY BACK IN DIFFERENT LOCALES

(75) Inventors: Min Ding, Beijing (CN); Chi Qi, Beijing (CN); Xiao Bin Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 2552 days.

(21) Appl. No.: 11/467,183

(22) Filed: Aug. 25, 2006

(65) Prior Publication Data

US 2007/0061113 A1    Mar. 15, 2007

(30) Foreign Application Priority Data

Aug. 25, 2005   (CN) .......................... 2005 1 0096612

(51) Int. Cl.
  *G06F 17/20*   (2006.01)
  *G06F 11/36*   (2006.01)

(52) U.S. Cl.
  CPC ................................. *G06F 11/3684* (2013.01)
  USPC .................. 704/8; 717/125; 717/124; 714/38; 714/37; 707/4; 707/3; 704/1; 702/193; 702/123; 702/104; 434/156; 382/229

(58) Field of Classification Search
  USPC ............... 704/1, 8; 717/125, 124; 714/38, 37; 702/193, 123, 104; 434/156; 382/229
  See application file for complete search history.

(56) References Cited

U.S. PATENT DOCUMENTS

| | | | |
|---|---|---|---|
| 4,914,590 A * | 4/1990 | Loatman et al. ................... 704/8 |
| 5,579,223 A * | 11/1996 | Raman ............... 704/1 |
| 6,167,567 A | 12/2000 | Chiles et al. |
| 6,272,456 B1 * | 8/2001 | de Campos ....................... 704/8 |
| 6,358,053 B1 * | 3/2002 | Rosenfield et al. ........... 434/156 |
| 6,385,552 B1 * | 5/2002 | Snyder ........................... 702/123 |
| 6,415,246 B1 * | 7/2002 | Snyder ........................... 702/193 |
| 6,421,793 B1 * | 7/2002 | Lester et al. .................... 714/37 |
| 6,530,039 B1 * | 3/2003 | Yang .......................... 714/38.13 |
| 6,539,118 B1 * | 3/2003 | Murray et al. ................ 382/229 |
| 6,542,841 B1 * | 4/2003 | Snyder ........................... 702/104 |
| 6,604,101 B1 * | 8/2003 | Chan et al. ..................... 707/706 |
| 6,810,364 B2 | 10/2004 | Conan et al. |
| 6,983,451 B2 * | 1/2006 | Colaiuta ........................ 717/125 |
| 6,985,901 B1 * | 1/2006 | Sachse et al. .......................... 1/1 |
| 7,299,452 B1 * | 11/2007 | Zhang et al. .................. 717/124 |
| 7,523,102 B2 * | 4/2009 | Bjarnestam et al. .................. 1/1 |
| 7,543,189 B2 * | 6/2009 | Fichter et al. .............. 714/38.14 |
| 2002/0144105 A1 | 10/2002 | Real |
| 2003/0236844 A1 | 12/2003 | Kaler et al. |
| 2004/0034853 A1 | 2/2004 | Gibbons et al. |
| 2004/0172601 A1 | 9/2004 | Rettig et al. |
| 2005/0065772 A1 | 3/2005 | Atkin et al. |

* cited by examiner

*Primary Examiner* — Michael Colucci
(74) *Attorney, Agent, or Firm* — Patents on Demand P.A.; Brian K. Buchheit; Scott M. Garrett (57) ABSTRACT

Apparatus and method for allowing a test script to be played back correctly in a locale of different test language. The invention uses a synonymy dictionary storing the different appearances of the property value of a property in an object of a software product to be tested in different test locales; and compares the property value of the property in the object of the software product to be tested to the corresponding property value pre-recorded in a test script to detect whether they match each other.

12 Claims, 6 Drawing Sheets

ENABLING TEST SCRIPT PLAY BACK IN DIFFERENT LOCALES

CROSS REFERENCE TO RELATED APPLICATIONS

Applicants claim the foreign priority benefits under 35 U.S.C. 119 of Chinese Patent Application No. 200510096612.6 filed 25 Aug. 2005.

FIELD OF THE INVENTION

The present invention relates to the field of test automation and, more particularly, to an apparatus and method for enabling correct playback of test scripts generated by automated test tools in locales of different test languages.

BACKGROUND OF THE INVENTION

In order to improve test efficiency, different types of automated test tools, such as the Rational Functional Tester of IBM, have been developed.

In a typical automated testing scenario, a tester performs a series of actions on an application under test in recording mode of an automated test tool meanwhile, the test toot will generate a test script based on the actions performed. Actions, identification properties (values of the identification properties) of the target objects, and expected property values of some target objects are recorded in the test script. Such a generated test script can then be played back automatically by a test tool in a test locale.

Figure 1:
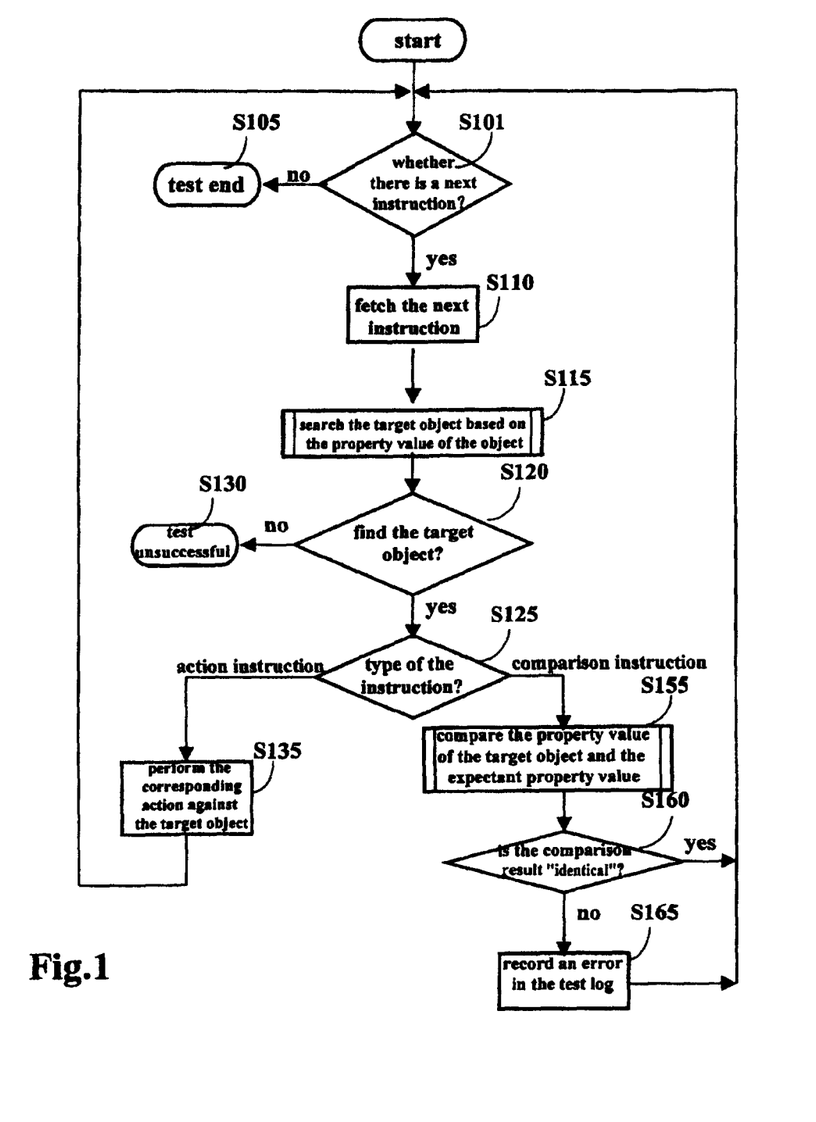
FIG. 1 is a flow chart of an illustrative process of playing back the test script in a test locale.

FIG. 1 shows the flow chart of an illustrative process of playing back a test script in a test locale.

First, in Step S101, the automated test tool checks whether there is a next test instruction in the test script. It proceeds to Step S105 and return a message showing that test is ended if there is no more test instructions. Otherwise, it proceeds to Step S110 to fetch the next test instruction.

In Step S115, the automated test tool tries to search a target object based on identification property value of the object recorded in test script. In Step S120, it is determined whether the target object is found. It proceeds to Step S130 to return a message indicating that the test is unsuccessful, if the target object is not found. Otherwise, it proceeds to Step S125 to determine the type of the instruction.

The process proceeds to Step S135 if the instruction is determined to be an action instruction. In Step S135, the action recorded in test script is performed against the target object. And then it returns to Step S101 to continue the process.

The process proceeds to Step S155 if the instruction determined in Step 125 is a comparison instruction, where the property value of the target object is compared to an expected property value. In Step S160 it is determined whether the comparison result is that the two values are identical. When the comparison result is "not identical", the process proceeds to Step S165 to record an error in the test log. Otherwise, it returns to Step S101 to continue the process.

Figure 2:
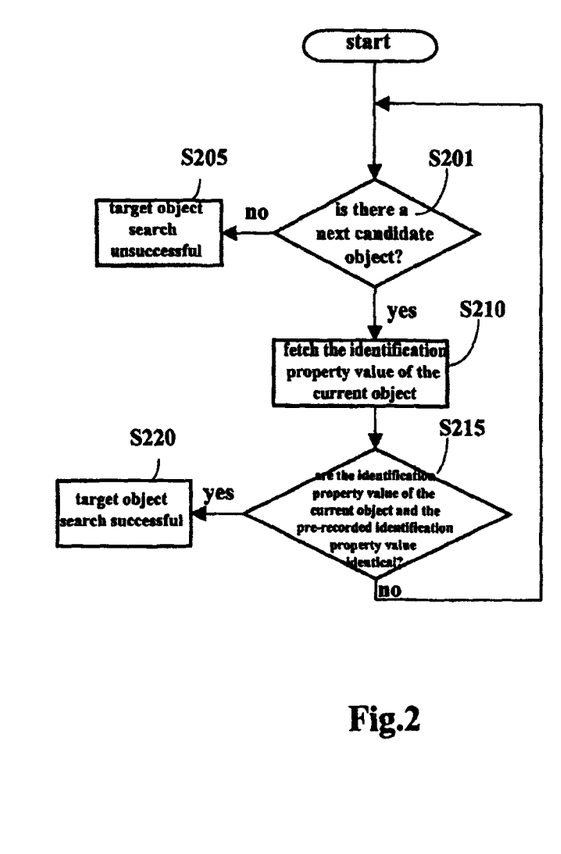
FIG. 2 is a flow chart of a target object search process.

FIG. 2 shows the target object search process performed in Step S115 in FIG. 1.

In FIG. 2, firstly, the automated test tool determines whether there is a next candidate object in Step S201. If it is determined that there is no more candidate object, the automated test tool returns a message indicating that the target object search is unsuccessful in Step S205. If there is a next candidate object, the automated test tool takes the candidate object as the current object, and fetches the identification property value of the current object in Step S210. In Step S215, it compares the identification property value of the current object to the identification property value of a target object recorded in the test script to determine whether the two values are identical. When the two values are identical, it proceeds to Step S220 to return a message indicating that the target object search is successful. Otherwise, it returns to Step S201 to continue the target object search process.

Figure 3:
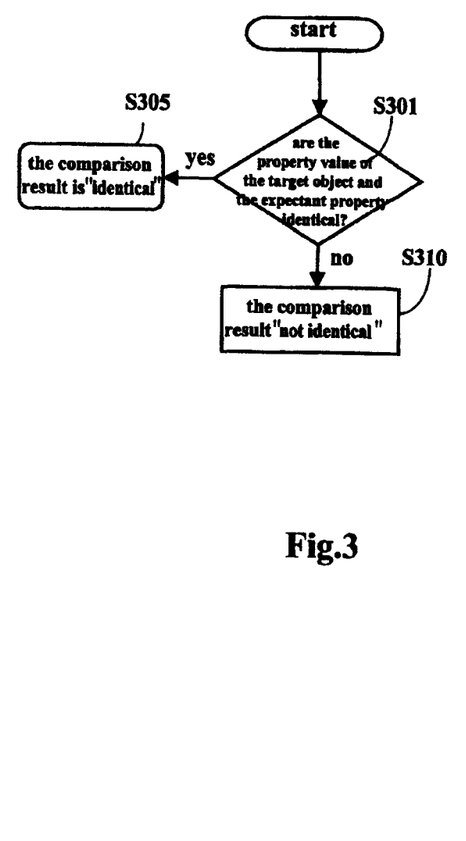
FIG. 3 is a flow chart of a property value comparison process.

FIG. 3 shows the property value comparison process performed in Step S155 in FIG. 1.

In Step S301, the process compares the property value of the searched target object to the expected property value of the corresponding object recorded in the test script. When the two values are identical, it proceeds to Step S305 to return a message indicating that the comparison result is "identical". Otherwise, when the two values are not identical, it proceeds to Step S310 to return a message indicating the comparison result is "not identical".

Globalized software products need to be tested in different locales to verify their functions in different language locates. A globalized software product usually has different appearances in different language locales, such as in China and in US. For example, English interfaces are used in US while Chinese interfaces are used in China. It means that the property values for the same object are different in different language locales.

Traditional automated test tools compare property values of objects literally. For example, in Step S215 of FIG. 2 and Step S301 of FIG. 3, the property values are compared with each other literally.

There is a problem with traditional automated test tools. That is, the test script generated in one language locale cannot be played back correctly in another language locale. Taking the target object "Press button" as an example, the property value of it in the test script generated in English locale is "OK" in English, while the property value of it in the test script generated in Chinese circumstance is "确认" in Chinese. And thus the test script generated in English circumstance will not be able to play back correctly in Chinese locale. In particular, in Step S215 in FIG. 2 and Step S301 in FIG. 3, it will have a result that the target object search is unsuccessful or the comparison result is "not identical."

Normally, there are two methods to walk around this problem. One is to modify the generated test script to enable playing back of it in other language locales; the other is to generate different test scripts for different language locales. However, these methods cost much time and efforts, and make scripts difficult to maintain.

SUMMARY OF THE INVENTION

In one embodiment, an automated test method that includes using a synonymy dictionary, which stores the different appearances of the property value of a property in an object of a software product to be tested in different test locales. The property value of the property in the object of the software product to be tested is compared to the corresponding property value pre-recorded in a test script to detect whether they match with each other.

In another embodiment, an automated test apparatus includes a storage for storing a synonymy dictionary, wherein the synonymy dictionary stores the different appearances of the property value of a property in an object of a software product to be tested in different test locales. A semantic-based property value comparison unit is also included for comparing the property value of the property in the object of the software product to be tested to the corresponding property value pre-recorded in a test script to detect whether they match each other.

DETAILED DESCRIPTION OF THE PREFERRED EMBODIMENTS

Figure 4:
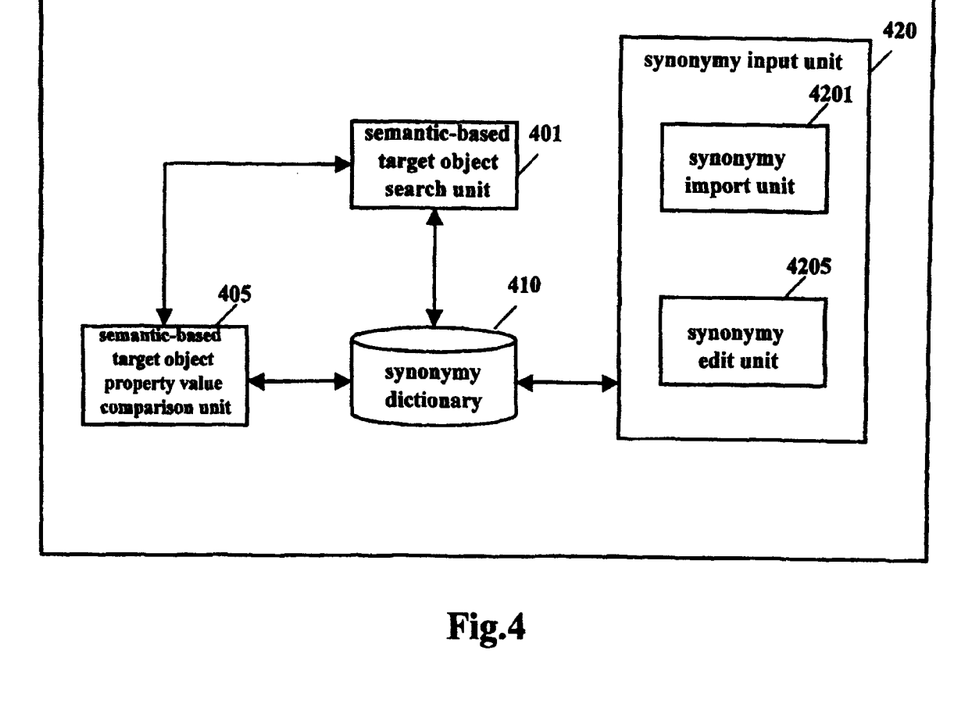
FIG. 4 is a block diagram of the automated test apparatus according to the present invention.

FIG. 4 is a block diagram of the automated test apparatus according to the present invention. Referring to this figure, the automated test apparatus according to the invention enables the test script to be played back correctly in test locales of different languages. An advantage can be implemented by replacing the module(s) performing the function of target object search and/or property value comparison in known automated test tools with the automated test apparatus according to the invention. Further, the automated test apparatus according to the invention may be a separate assist tool. In the later case, when the known automated test tools play back test scripts, they transfer the property value comparison work to the automated test apparatus according to the invention, in order to realize the object of the invention. The automated test apparatus according to the invention is especially used when the property values are compared during the play back of a test script. The automated test apparatus according to the invention comprises a semantic-based target object search unit 401, a semantic-based target object property value comparison unit 405, a synonymy input unit 420 and a synonymy dictionary (synonymy storage) 410.

The synonymy dictionary 410 stores synonymies. The synonymy dictionary 410 can be implemented by being stored in memory, or by being stored in other external storage and being read into the memory as necessary. Strings having the same meaning are associated and stored together within one group or one record or in any other manner. The following description assumes that strings with the same meaning are stored in one group.

The synonymy input unit 420 comprises a synonymy import unit 4201 and a synonymy edit unit 4205, for inputting the synonymies involved in globalized software products into the synonymy dictionary 410.

The synonymy import unit 4201 extracts strings with the same meaning from known resource bundles of globalized software as synonymies and stores them into the synonymy dictionary 410.

The synonymy edit unit 4205 provides a user interface for a user so as to manually edit the synonymies in the dictionary.

The synonymy dictionary 410 is edited by using the synonymy input unit 420 so as to make sure that the different appearances in different language locales for one property value are included in the same group. For example, for the property "OK", the English string "OK", the Chinese character "确认" and the Japanese character "確認" . . . are stored in the same group. The synonymy dictionary 410 can be updated by using the synonymy input unit 420 according to the language circumstance to be applied.

According to the invention, the synonymy dictionary 410 can be repeatedly used by a plurality of test scripts.

The semantic-based target object search unit 401 compares the property value of the candidate object to the identification property value in the test script to detect whether they are in the same group in the synonymy dictionary 410. The comparison result will be "identical" if they are in the same group.

The semantic-based target object property value comparison unit 405 compares the property value of the target object. For the property value of the property of the searched target object, it detects whether it is in the same group with the expected property value of the property of the corresponding target object stored in the test script. The comparison result will be "identical" if they are in the same group.

In the present embodiment, the semantic-based target object search unit 401 and the semantic-based target object property value comparison unit 405 separately searches the target object and compare the property value of the target object. However, it will be apparent for the persons in the art that the above two units can be combined as one single functional block (property value comparison unit) to implement the comparison of property values; or only the semantic-based target object search unit 401 is used for performing the target object search; or only the semantic-based target object property value comparison unit 405 is used for performing the comparison of the property values of objects.

Further, the invention may be introduced only when the property values are compared, while other processes related to the test are implemented by automated test tools.

The above functional units of the invention can be implemented in the manner of an executing program in the CPU of a common computer, or a hardware logical circuits or the combination of hardware and software or firmware.

Figure 5:
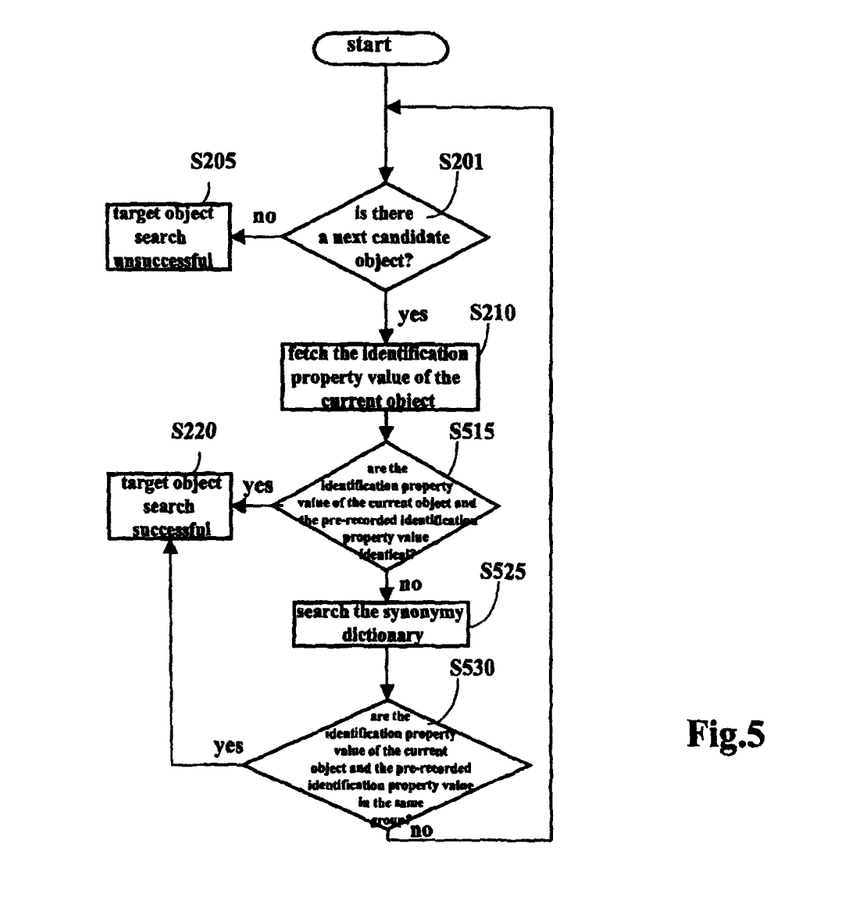
FIG. 5 is a flow chart of the target object search process according to the present invention.

The target object search process according to the invention will be described by referring to FIG. 5. The same reference numerals are used for the parts that are the same as in FIG. 2.

Firstly, the automated test tool determines whether there is a next candidate object in Step S201. When it determines there is not a next candidate object, the automated test tool returns a message indicating the target object search is unsuccessful in Step S205. When it determines there is a next candidate object, the automated test tool takes the candidate object as the current object, and fetches the identification property value of the current object in Step S210.

In Step S515, the semantic-based target object search unit 401 according to the invention compares the identification property value of the current candidate object to the identification property value of a target object recorded in the test script, to determine whether the two values are identical. When the two values are identical, it proceeds to Step S220 to return a message that the target object search is successful. Otherwise, it proceeds to Step S525.

In Step S525, the semantic-based target object search unit 401 retrieves the synonymy dictionary 410 based on the identification property value of the current object and the identification property value of the target object recorded in the test script. In Step S530, the semantic-based target object search unit 401 detects whether the identification property value of the current object and the identification property value of the target object are located in the same group in the synonymy dictionary 410. When they are in the same group, it proceeds to Step S220 to return a message indicating the target object search is successful. Otherwise, it returns to Step S201 to continue the process.

With the above process, the test script can be correctly played back to successfully search out target objects, even if the test script is played back in a locale of different language from where it is generated.

Figure 6:
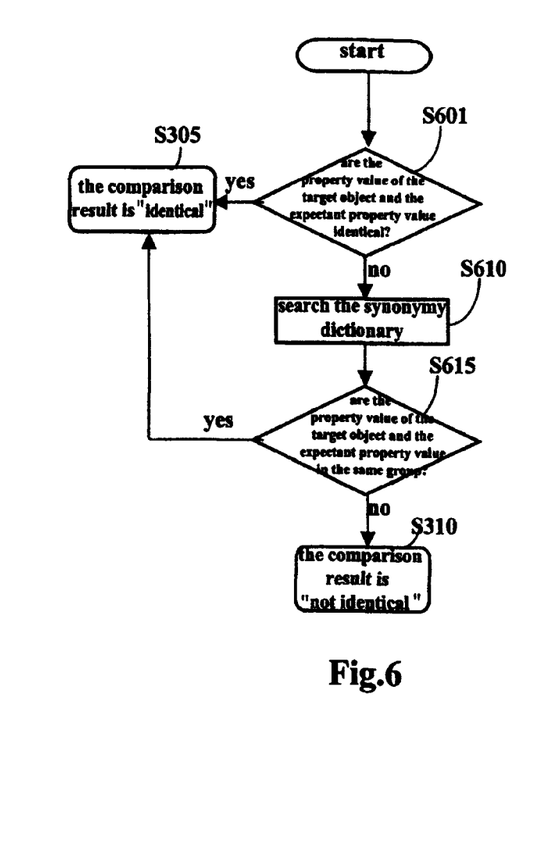
FIG. 6 is a flow chart of the property value comparison process according to the present invention.

The target object property value comparison process will be described by referring to FIG. 6. The same reference numerals are used for the parts which are the same as in FIG. 2.

In Step S601, the semantic-based target object property value comparison unit 405 compares the property value of the searched target object to the expected property value of the corresponding object recorded in the test script. When the two values are identical, it proceeds to Step S305 to return a message indicating that the comparison result is "identical". When the two values are not identical, it proceeds to Step S610.

In Step S610, the semantic-based target object property value comparison unit 405 retrieves the synonymy dictionary 410 based on the property value of the target object and the expected property value. In Step S615, the semantic-based target object property value comparison unit 405 detects whether the property value of the target object and the expected property value are located in the same group in the synonymy dictionary 410. When they are in the same group, it proceeds to Step S305. Otherwise, it proceeds to Step S310 to output a message indicating that the comparison result is "not identical".

With the above process, the test script can be correctly played back to successfully take the comparison test against the property value of the target object even if the test script is played back in a locale of different language from where it is generated.

It will be appreciated by those skilled in the art that the invention may be used in test locales of the same language as the generating locale. In this case, different synonymies for one property in the same test language locale are stored in the synonymy dictionary. For example, in the Chinese test environment, the Chinese characters "存储", "保存" and "存放" represent the same property value, and they are stored in one group. When two property values to be compared are in one group it is determined that the test passes.

In addition the above operation process can be implemented in the form of a program executable by computer stored in different medium, or by being downloaded from communication network and being executed by computer. The medium for providing the program comprises, for example, memory or memory unit, semiconductor, disk unit such as optical disk, magnetic disk and magneto-optic disk or any other medium suitable for storing information.

The present invention may have a plurality of varied embodiments within the spirit and scope of the invention. Therefore, it will be appreciated that, the scope of protection of the invention is defined by the following claims, but not limited to the specific embodiments.

While the embodiments of the invention have been described in detail with reference to attached drawings, various changes and modifications may be made to the above embodiments without departing from the spirit and scope of the invention. Therefore, the scope of the invention is only defined by the attached claims.

The invention claimed is:

1. An automated computer-implemented test method, comprising:
   storing, in a synonymy dictionary of a computer-implemented test system, a group of synonyms including a plurality of synonyms corresponding to a plurality of different languages for a property value of a property of an object of a globalized software product to be tested in different test locales, wherein the globalized software product and the object are digitally encoded in a storage medium;
   performing a pre-recorded test script on the software product;
   identifying the object in the software product, including the property value;
   comparing the property value of the property of the object to a corresponding property value in the test script and the group of synonyms in the synonymy dictionary corresponding to the property value; and
   determining if the object passes the test based on whether the property value matches either the property value in the test script or one of the synonyms in the synonymy dictionary corresponding to the property.

2. The automated computer-implemented test method according to claim 1, wherein the comparing step further comprises at least one of the steps:
   a target object search step, for comparing the property value in the test script and the corresponding property value of the candidate object in the software product to detect whether they match with each other; and
   a target object property value comparing step, for comparing the property value of the target object searched out in the software product to be tested to the corresponding expected value pre-recorded in the test script or the synonymy dictionary to detect whether they match with each other.

3. The automated computer-implemented test method according to claim 1, wherein:
   the test script is generated in a first test language locale in a first language; and
   the software product is tested in a second test language locale different from the first test language locale in a second language.

4. The automated computer-implemented test method according to claim 1, wherein:
   the property values having the same meaning are associated and stored in the synonymy dictionary via a synonymy interface; and
   detecting whether the property value of the property in the object in the software product to be tested and the corresponding property value pre-recorded in the test script match with each other is done by detecting whether they are associated and stored in the synonymy dictionary.

5. An automated test apparatus, comprising:
   a storage having a synonymy dictionary stored therein, wherein the synonymy dictionary stores a plurality of synonyms, each of the synonyms corresponding to one of a plurality of different languages for a property value of a property in an object of a globalized software product to be tested in different test locales and in different languages; and
   a semantic-based property value comparison unit which compares the property value of the property in the object of the software product being tested to a corresponding property value pre-recorded in a test script and the corresponding property value in the synonymy dictionary to detect whether the property value is valid.

6. The automated test apparatus according to claim 5, wherein said semantic-based property value comparison unit further comprises:
   a semantic-based target object search unit, for comparing the identification property value in the test script and the corresponding property value of the candidate object in the software product to be tested to detect whether they match each other, and determining the matched candidate object to be a target object; and a semantic-based target object property value comparison unit, for comparing the property value of the target object searched in the software product to be tested to the corresponding expected value pre-recorded in the test script or the synonymy dictionary to detect whether they match each other.

7. The automated test apparatus according to claim 5, wherein:

the test script is generated in a first test language; and the software product is tested in a second test language different from the first test language.

8. The automated test apparatus according to claim 6, wherein:

the property values having the same meaning are associated and stored in the synonymy dictionary via a synonymy interface; and said semantic-based target object search unit and said semantic-based target object property value comparison unit detect whether the property value of the property in the object in the software product to be tested and the corresponding property value pre-recorded in the test script match each other by detecting whether they are associated and stored in the synonymy dictionary.

9. The automated test apparatus according to claim 5, further comprising a synonymy input unit which allows a user to input the synonymies involved in the software product to be tested into said synonymy dictionary.

10. A computer useable medium embodying computer program code, the computer program code comprising computer executable instructions configured for:

storing, in a synonymy dictionary of a computer-implemented test system, a group of synonyms including a plurality of synonyms corresponding to a plurality of different languages for a property value of a property of an object of a globalized software product to be tested in different test locales;

performing a pre-recorded test script on the software product;

identifying the object in the software product, including the property value;

comparing the property value of the property of the object to a corresponding property value in the test script and the group of synonyms in the synonymy dictionary corresponding to the property value; and determining if the object passes the test based on whether the property value matches either the property value in the test script or one of the synonyms in the synonymy dictionary corresponding to the property.

11. The computer-useable medium of claim 10, wherein the embodied computer program code further comprises computer executable instructions configured to perform at least one of the following steps:

a target object search step, for comparing the property value in the test script and the corresponding property value of the candidate object in the software product to detect whether they match with each other; and a target object property value comparing step, for comparing the property value of the target object searched out in the software product to be tested to the corresponding expected value pre-recorded in the test script or the synonymy dictionary to detect whether they match with each other.

12. The computer-useable medium of claim 10, wherein the embodied computer program code further comprises computer executable instructions configured for:

associating and storing in the synonymy dictionary the property values having the same meaning via a synonymy interface; and detecting whether the property value of the property in the object in the software product to be tested and the corresponding property value pre-recorded in the test script match each other is done by detecting whether they are associated and stored in the synonymy dictionary.

\* \* \* \* \*